United States Patent [19]
Mizutani et al.

[11] Patent Number: 5,288,237
[45] Date of Patent: Feb. 22, 1994

[54] IC CARD CONNECTOR SUPPORTING/FIXING MECHANISM

[75] Inventors: Yoshitaka Mizutani, Sanda; Shigeo Onoda; Hajime Maeda, both of Itami, all of Japan

[73] Assignee: Mitsubishi Denki Kabushiki Kaisha, Tokyo, Japan

[21] Appl. No.: 979,005

[22] Filed: Nov. 19, 1992

[30] Foreign Application Priority Data

Jan. 8, 1992 [JP] Japan ................................. 4-001417

[51] Int. Cl.$^5$ ............................................. H01R 4/58
[52] U.S. Cl. ...................................................... 439/76
[58] Field of Search ...................... 439/76, 78, 82, 55

[56] References Cited

U.S. PATENT DOCUMENTS 4,887,188 12/1989 Yoshida et al. ..................... 361/413
4,900,266 2/1990 Sainsbury et al. ..................... 439/76

Primary Examiner—P. W. Echols
Attorney, Agent, or Firm—Leydig, Voit & Mayer

[57] ABSTRACT

A connector-supporting element of a main frame of an IC card and a sub-frame receive holding parts of a connector. The connector-supporting element has barriers having a height of at least one-half that of the holding parts for receiving the barriers and a force applied in the direction along bonded surfaces of the connector-supporting element and the sub-frame. Oblique surfaces are respectively provided on each of the barriers and there is a positional deviation in the parts.

5 Claims, 4 Drawing Sheets

IC CARD CONNECTOR SUPPORTING/FIXING MECHANISM

BACKGROUND OF THE INVENTION

1. Field of the Invention

The present invention relates to a mechanism for supporting and mounting a connector on a main frame of an IC card together with a circuit substrate.

2. Description of the Related Art

FIG. 6 is an exploded perspective view of a conventional IC card. An IC card 10 comprises a main frame 2 and a circuit substrate 4 and a connector 1, both of which are mounted on the frame 2. A circuit pattern 4b on one or both of the sides of the circuit substrate 4 connects a plurality of electronic parts 4a mounted on the pattern 4b. The circuit substrate 4 is supported by the inner side of a circuit substrate supporting/holding part 2a of the main frame 2 and fixed thereto by caulking (not shown in the drawing) or the like.

On the other hand, the connector 1 comprises a connector body part 1b having a plurality of external connection terminals 1a and holding parts 1c respectively on both sides of the body part 1b for mounting the connector 1. The connector 1 is separate from the circuit substrate 4b, and each of the external connection terminals 1a is electrically connected to the circuit pattern 4b of the substrate 4 by a lead wire (not shown) or the like. The external connection terminals 1a are exposed to air from the terminal surface of the connector body part 1b, which surface forms a surface on the insertion side of the IC card 10, so as to be connectable from the outside. The lower connector-supporting part 2b of the main frame 2 is previously formed into a shape which engages the lower half of the connector 1 so that the connector 1 engages the connector-supporting part 2b. A sub-frame 3 which is previously formed into a shape which engages the upper half of the connector 1 is fixed to the connector-supporting part 2b by an adhesive 7, with the connector 1 held therebetween (refer to FIG. 7), whereby the connector 1 is mounted. FIG. 7 is a partially sectional view taken along an arrow B in FIG. 6 and shows the holding parts 1c of the connector 1 engaged with the connector-supporting part 2b and the sub-frame 3 and fixed thereby after the IC card has been assembled.

Metal panels 5 and 6 are bonded, by an adhesive (not shown), to respective sides of the circuit substrate supporting/holding part 2a of the main frame 2 on which the circuit substrate 4 is mounted to cover both sides of the circuit substrate 4. The panels bonded respectively extend over the whole front and rear sides of the IC card 10, which include the surfaces of the connector supporting part 2b of the main frame 2, the sub-frame 3 and the connector body part 1b.

The state wherein the connector 1 engages with the connector-supporting part 2b and the sub-frame 3 is described in detail below. The connector body part 1b of the connector 1 has substantially the same thickness (height) as the circuit substrate supporting/holding part 2a of the main frame 2. Each of the holding parts 1c provided on both sides of the body part 1b has a width along the direction of card insertion and a thickness, both of which are smaller than those of the body part 1b. Both the connector supporting part 2b and the sub-frame 3 have a thickness (height) of about half that of the circuit substrate supporting/holding part 2a or the body part 1b of the connector 1.

The connector supporting part 2b has an opening 2c to engage the lower half of the body part 1b of the connector 1 and recesses 2d to respectively engage with the lower halves of the holding parts 1c. The sub-frame 3 has an opening 3a to engage with the upper half of the body part 1b of the connector 1 and recesses 3b to respectively engage the upper halves of the holding parts 1c. The opening 2c and the recesses 2d have the same shapes as the opening 3a and the recesses 3b, respectively.

The sub-frame 3 is bonded to the connector supporting part 2b so that the connector 1 is held between the connector supporting part 2b and the sub-frame 3 and fixed therebetween. The holding parts 1c of the connector 1 are respectively held and fixed between the upper and lower recesses 2d, 3b, and the body part 1b engages the openings 2c, 3a and is fixed thereby.

Since the conventional mechanism for supporting and fixing a connector in an IC card has the above configuration, the mechanism has the problem that, for example, when the card is dropped, if force is applied to the portion fixing the connector, particularly, in the direction along the bonded surfaces of the connector supporting part of the main frame and the sub-frame, there is the danger of separation of the sub-frame from the connector supporting part and disassembly of the card.

The conventional mechanism has another problem when the connector is mounted during the process of assembling the IC card, much time is taken for adjusting the positions of the holding parts of the connector and the recesses of the connector supporting part and the sub-frame because of a small allowable error of engagement therebetween.

SUMMARY OF THE INVENTION

The present invention has been achieved for solving the above problems, and it is an object of the present invention to improve the mounting strength of a connector so as to prevent a card from being disassembled even if a mechanism for supporting and fixing the connector is subjected to force when the card is dropped or the like. It is another object of the invention to facilitate the engagement between the connector supporting part of a main frame, the connector and a sub-frame during the process of assembling the IC card.

Considering the above objects, the present invention provides an IC card connector supporting/holding mechanism for supporting and fixing a connector provided with a plurality of external connector terminals to a portion of a main frame on a card insertion side at a position where a circuit substrate having electronic parts mounted thereon is located, the mechanism comprising a connector comprising a connector body part having a terminal surface from which the plurality of external connector terminals electrically connected to the electronic parts mounted on the circuit substrate are exposed to air so as to be connectable from outside, and holding parts which are respectively located on both sides of the connector body part in the direction of card insertion, each of which has a width along the direction of card insertion and a thickness, both of which are smaller than those of the connector body part, and each of which has a surface on the card insertion side, the side surface along the direction of card insertion and a surface on the substrate side; a lower connector supporting part which is formed according to the shape of the lower half of the connector so that about a lower half of the connector is fitted thereinto, which has barrier parts each having a height of half or more the thickness of the holding parts of the connector and provided at least along the portions which respectively contact with surfaces of the holding parts of the connector on the card insertion side and the side surfaces thereof, and which is formed in the main frame on the card insertion side so as to support the connector without deviating it in the horizontal direction; a sub-frame which fixes the connector held between the sub-frame and the lower connector supporting part of the main frame so as to fix the connector without deviating it in the horizontal and vertical directions and which is formed according to the shape of the upper half of the connector and the shapes of the barrier parts of the lower connector supporting part so that the upper half of the connector and the barrier parts are fitted thereinto; and fixing means for fixing the sub-frame to the lower connector supporting part.

In the present invention, each of the barrier parts and the holding parts of the connector has tapered surfaces at the edges thereof.

In the present invention, since the holding parts of the connector are respectively held by the barrier parts which are provided on the connector supporting part of the main frame and each of which has a height of half or more the thickness of the holding parts, even if force is applied in the direction along the bonded surfaces of the connector supporting part and the sub-frame, there is no danger of separation of the sub-frame from the connector supporting part because the whole force is received on the side of the connector supporting part provided with the barrier parts.

In addition, since the tapered surface is provided on each of the barrier parts and the holding parts of the connector, when the connector supporting part, the connector and the sub-frame are engaged with each other during the process of assembling an IC card, the mounting positions thereof can be corrected to regular positions even if there are deviations in the mounting positions.

DESCRIPTION OF PREFERRED EMBODIMENTS

An embodiment of the present invention is described below with reference to the attached drawings.

Figure 1:
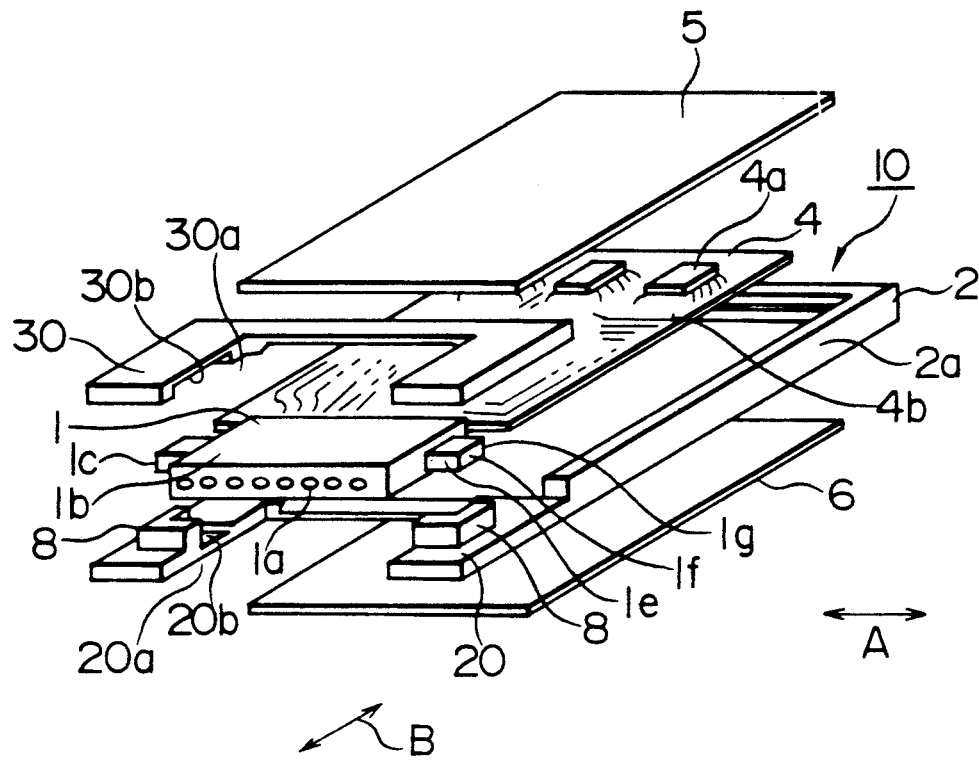
FIG. 1 is an exploded perspective view of an IC card provided with a connector supporting/holding mechanism in accordance with an embodiment of the present invention.
Figure 2:
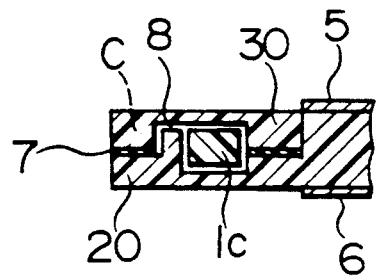
FIG. 2 is a partial sectional view of the connector of an assembled card taken along the direction of an arrow B in FIG. 1.
Figure 3:
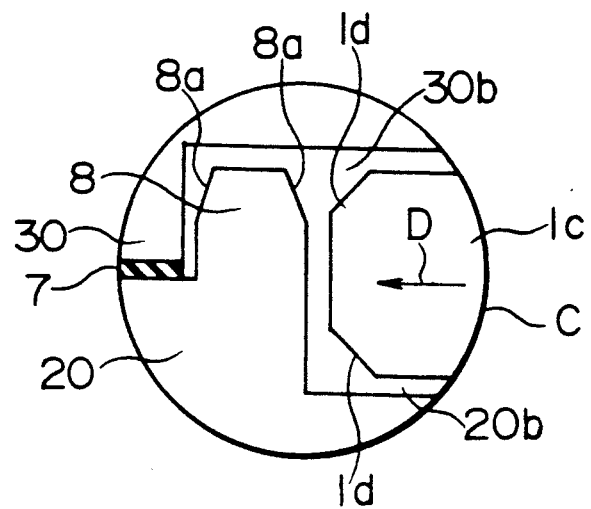
FIG. 3 is a partial enlarged view of the portion C shown by a broken line in FIG. 2.
Figure 6:
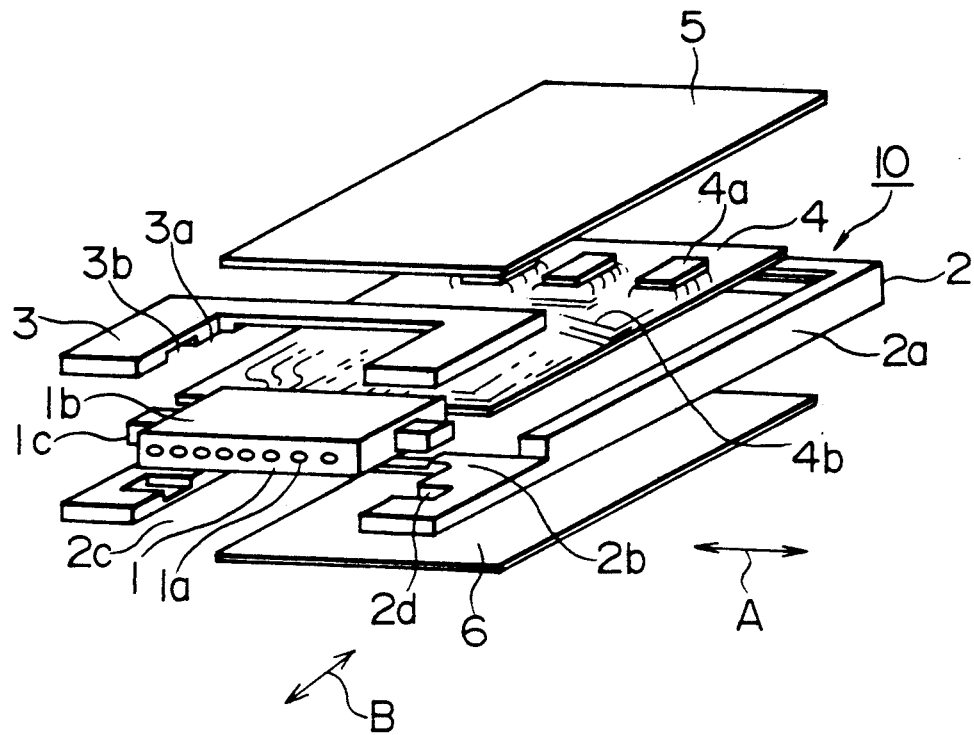
FIG. 6 is an exploded perspective view of a conventional IC card.
Figure 7:
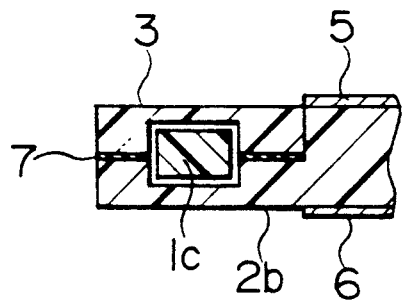
FIG. 7 is a partial sectional view of the assembled connector taken along the direction of an arrow B in FIG. 6.

FIG. 1 is an exploded perspective view of an IC card provided with a connector supporting/holding mechanism in accordance with an embodiment of the present invention, FIG. 2 is a partial sectional view of a portion near a connector of the assembled IC card taken along the direction shown by an arrow B in FIG. 1, and FIG. 3 is an enlarged view of the portion C shown by a broken line in FIG. 2. The same reference numerals as those in the conventional IC card shown in FIGS. 6 and 7 denote the same or equivalent portions which are not described below.

In FIGS. 1 and 2, although a connector 1 is the same as the conventional connector, the surface on the card insertion side, the side surfaces and the surface on the substrate side of each of the holding parts 1c are denoted by 1e, 1f and 1g, respectively, for the sake of convenience of description. The lower connector supporting part 20 of a portion of the main frame 2 on the card insertion side and the sub-frame 30 which serves as an upper connector supporting part engaged with the lower connector supporting part 20 each have a thickness (height) of about half that of the circuit substrate supporting/holding part 2a or the body part 1b of the connector 1.

The connector supporting part 20 has an opening 20a to engage the lower half of the body part 1b of the connector 1 and recesses 20b to respectively engage the lower halves of the holding parts 1c. Barriers 8 each having a height of half or more that of the holding parts 1c are located on portions of the recesses 20b, which respectively contact the surfaces 1e of the holding parts 1c of the connector 1 on the card insertion side and the side surfaces 1f thereof. The sub-frame 30 has an opening 30a to engage the upper half of the body part 1b of the connector 1 and recesses 30b to respectively engage the upper halves of the holding parts 1c and the barriers 8 of the connector supporting part 20. The sub-frame 30 engages the connector supporting part 20, with the connector 1 therebetween, and fixed to the connector supporting part 20 by fixing means such as an adhesive 7 or the like.

For example, even if force is applied to the holding parts 1c of the connector 1 in the direction shown by an arrow D in FIG. 3 when an IC card is dropped, and even if force is thus applied in the direction along the bonded surfaces of the connector supporting part 20 and the sub-frame 30, since the whole force is therefore received by the recesses 20b of the connector supporting part 20 due to the barriers 8, the sub-frame 3 is not separated from the connector supporting part 20. This applies to the direction perpendicular to the direction of card insertion, i.e., the direction shown by an arrow A in FIG. 1.

Figure 4:
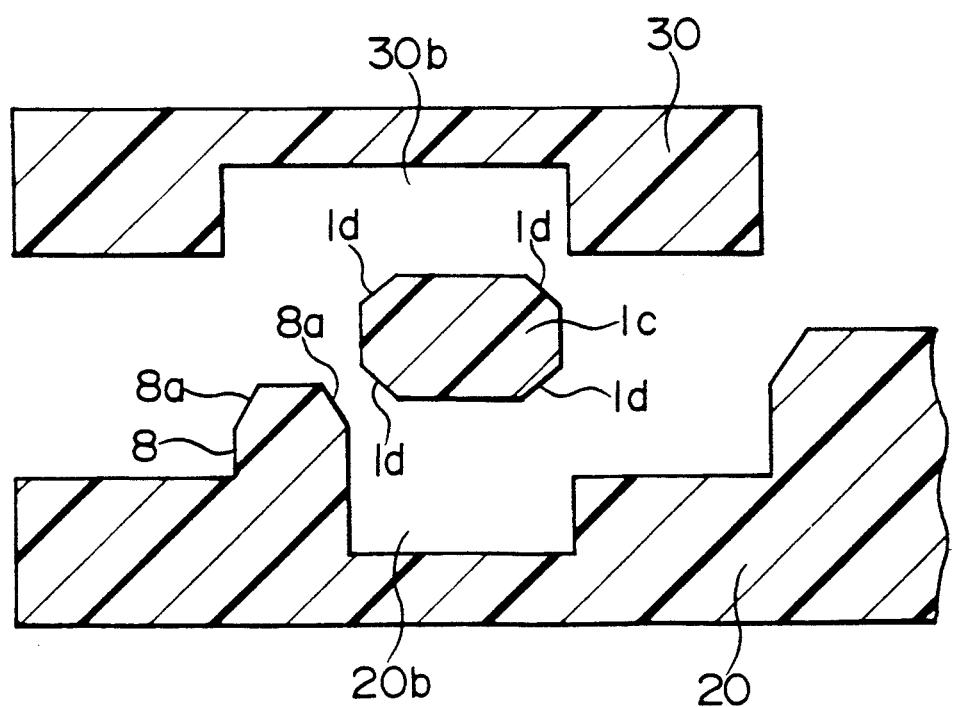
FIG. 4 is an exploded sectional view of the connector taken along the direction of an arrow B in FIG. 1.
Figure 5:
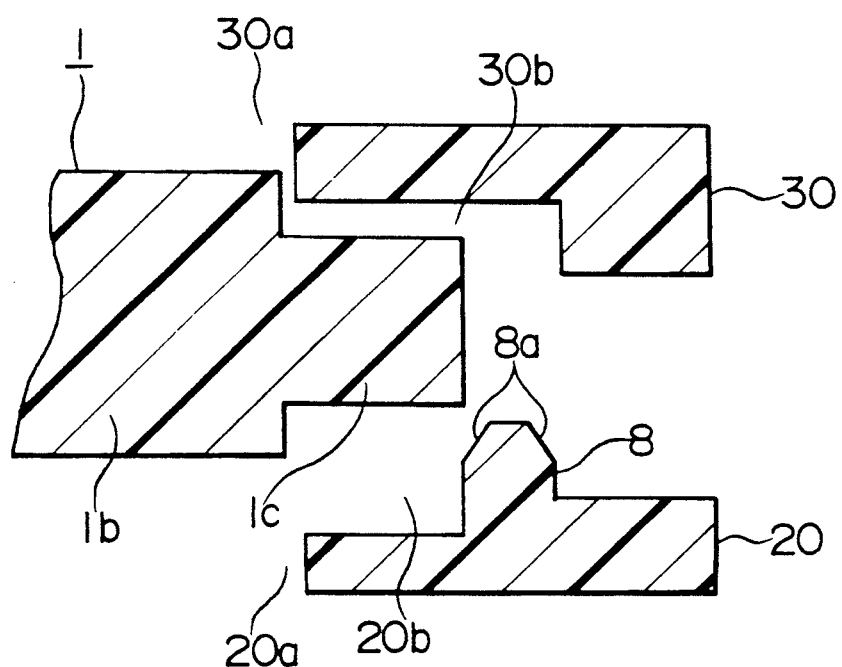
FIG. 5 is an exploded sectional view of the connector taken along the direction of an arrow A in FIG. 1.

In order to explain the assembly of the connector 1, the connector supporting part 20 and the sub-frame 30, FIG. 4 shows an exploded sectional view of the connector 1 taken along the direction of the arrow B in FIG. 1, and FIG. 5 shows an exploded sectional view taken along the direction of the arrow A in FIG. 1. As can be seen from the drawings, each of the recesses 30b in the sub-frame 30 has a size which can receive the upper half of each of the holding parts 1c of the connector 1 and each of the barriers 8 in the connector supporting part 20 in the directions of the arrows A and B in FIG. 1.

In addition, a tapered surface 8a may be provided at the upper edge of each of the barriers 8. Similarly, a tapered surface 1d may be formed at the edge of each of the holding parts 1c of the connector 1, which edge extends along a direction perpendicular to the direction of card insertion. The tapered surfaces 8a, 1d enable the connector 1, the connector supporting part 20 and the sub-frame 30 to be easily engaged with each other at regular positions thereof during the engaging process even if there is a positional deviation in each of the parts.

In the above embodiment, no barrier 8 is provided on the portions of the recesses 20b of the connector supporting part 20, which respectively contact the surfaces 1g the holding parts 1c of the connector 1 on the substrate side. This is because when force is applied in the direction toward the surfaces 1g, the circuit substrate supporting/holding part 2a receives the force because the surfaces 1g of the holding parts 1c on the substrate side are placed inside the card, and there is thus little possibility of separation of the sub-frame 3. However, when the connector 1 is more stably fixed, the barriers 8 may be respectively provided on the portions of the recesses 20b, which respectively contact the surfaces 1g of the holding parts 1c on the substrate side.

As described above, the IC card connector supporting/holding mechanism in accordance with the present invention comprises the barriers 8 which each have a height of half or more that of the holding parts 1c of the connector 1 and which are respectively located on the recesses 20b of the connector supporting part 20 on the side of the main frame 2. When the card is dropped, therefore, the recesses 20b of the connector supporting part 20, on which the barriers are respectively formed, receive the force applied in the direction along the bonded surfaces of the connector supporting part 20 and the sub-frame 30. The mechanism thus has the effect of making the sub-frame 30 difficult to separate. In addition, since the tapered surfaces 8a, 1d are respectively provided at the upper edges of the barriers 8 and the edges of the holding parts 1c of the connector 1, the mechanism enables easy assembly of the connector 1, the connector supporting part 20 and the sub-frame 30 even if there is a positional deviation in each of the parts.

What is claimed is:

1. An IC card connector supporting/holding mechanism for supporting and holding in an IC card a connector having a plurality of external connection terminals comprising:

a connector comprising a connector body having a terminal surface from which a plurality of external connection terminals electrically connected to electronic parts mounted on a circuit substrate of an IC card are accessible from outside the IC card, opposed side surfaces transverse to the terminal surface, holding parts extending from and transverse to the side surfaces of said connector body, each of said holding parts having a width transverse to the side surfaces and a thickness transverse to the width, the width and thickness both being smaller than a width and thickness of said connector body, and each of said holding parts having a front surface on the terminal surface side, a side surface parallel to the side surfaces of said connector body, and a rear surface opposed to the front surface;

a lower connector-supporting element having a shape complementary to a lower half of said connector body for receiving the lower half of said connector body and including two barriers, each barrier having a height of at least one-half the thickness of said holding parts for contacting the front surfaces of said holding parts and the side surfaces of the holding parts to support said connector without deviation parallel to a common axis of said holding parts, said barriers being unitary with a main frame of the IC card;

a sub-frame for fixing said connector in place by clamping said connector body between said lower connector-supporting element and said sub-frame without deviation parallel and transverse to the common axis and having a shape complementary to an upper half of said connector body and said barriers for receiving said upper half of said connector body and said barriers; and fixing means for fixing said sub-frame to said lower connector-supporting element.

2. An IC card connector supporting/holding mechanism according to claim 1 wherein each of said barriers has a plurality of surfaces and each of said holding parts has a plurality of surfaces extending in a direction perpendicular to the side surfaces of said connector body wherein at least one of said barriers and holding parts includes oblique surfaces for easy engagement of said holding parts and lower connector-supporting element with each other.

3. An IC card connector supporting/holding mechanism according to claim 1 wherein said lower connector-supporting element has an opening for engaging said connector body and recesses for respectively engaging said holding parts and said sub-frame has an opening for engaging said connector body and recesses for respectively engaging said holding parts and said barriers of said lower connector-supporting element.

4. An IC card connector supporting/holding mechanism according to claim 1, wherein said fixing means is an adhesive.

5. An IC card connector supporting/holding mechanism according to claim 1 wherein said barriers include parts for contacting the rear surfaces of said holding parts, each of said parts for contacting the rear surfaces having a height of at least one-half the thickness of each of said holding parts.

* * * * *